(12) United States Patent
Nomura (10) Patent No.: US 11,982,379 B2
(45) Date of Patent: May 14, 2024

(54) FUEL PIPING, FUEL PIPING CONNECTING STRUCTURE, AND METHOD FOR MANUFACTURING FUEL PIPING

(71) Applicant: Sanoh Industrial Co., Ltd., Tokyo (JP)

(72) Inventor: Masakazu Nomura, Koga (JP)

(73) Assignee: Sanoh Industrial Co., Ltd., Tokyo (JP)

( * ) Notice: Subject to any disclaimer, the term of this patent is extended or adjusted under 35 U.S.C. 154(b) by 82 days.

(21) Appl. No.: 17/787,186

(22) PCT Filed: Dec. 1, 2020

(86) PCT No.: PCT/JP2020/044708
§ 371 (c)(1),
(2) Date: Jun. 17, 2022

(87) PCT Pub. No.: WO2021/131537
PCT Pub. Date: Jul. 1, 2021

(65) Prior Publication Data
US 2023/0025308 A1   Jan. 26, 2023

(30) Foreign Application Priority Data
Dec. 25, 2019  (JP) ................. 2019-234715

(51) Int. Cl.
| | | |
|---|---|---|
| *F16L 13/14* | (2006.01) | |
| *F16L 9/18* | (2006.01) | |
| *F16L 19/028* | (2006.01) | |

(52) U.S. Cl.
CPC ........... *F16L 19/0283* (2013.01); *F16L 9/18* (2013.01)

(58) Field of Classification Search
CPC ..... F16L 19/0283; F16L 19/028; F16L 19/02; F16L 19/04; F16L 19/06; F16L 19/065; F16L 9/18; F16L 9/20; F16L 13/0218; F16L 13/0227; F16L 13/14; F16L 13/141; F16L 13/16; F16L 13/161; F02M 55/02
See application file for complete search history.

(56) References Cited

U.S. PATENT DOCUMENTS

| | | | |
|---|---|---|---|
| 4,469,356 A * | 9/1984 | Duret | ............ F16L 19/028 29/523 |
| 2010/0244440 A1* | 9/2010 | Badarinarayan | ... F02M 37/0017 138/109 |

FOREIGN PATENT DOCUMENTS

| | | |
|---|---|---|
| JP | S64-089149 A | 4/1989 |
| JP | 2001-227431 A | 8/2001 |
| JP | 2005-180218 A | 7/2005 |
| JP | 2007-077807 A | 3/2007 |
| JP | 2007-332954 A | 12/2007 |

(Continued)

OTHER PUBLICATIONS

Patent Cooperation Treaty, International Search Report, Application No. PCT/JP2020/044708, dated Jan. 5, 2021, in 2 pages.

(Continued)

*Primary Examiner* — Aaron M Dunwoody
(74) *Attorney, Agent, or Firm* — PROCOPIO, CORY, HARGREAVES & SAVITCH LLP (57) ABSTRACT

A fuel piping includes an outer pipe that has a connecting head extending outward in a radial direction in at least one end portion thereof and an inner pipe that is built in a part of the outer pipe and is connected to both end portions of the connecting head in an axial direction.

5 Claims, 8 Drawing Sheets

(56) References Cited

FOREIGN PATENT DOCUMENTS

JP    2010242712 A    10/2010

OTHER PUBLICATIONS

Patent Cooperation Treaty, International Preliminary Report on Patentability, Application No. PCT/JP20202/044708, dated Jul. 7, 2022, in 6 pages.

\* cited by examiner

FUEL PIPING, FUEL PIPING CONNECTING STRUCTURE, AND METHOD FOR MANUFACTURING FUEL PIPING

CROSS-REFERENCE TO RELATED APPLICATIONS

This application is US National Stage of International Patent Application PCT/JP2020/044708, filed Dec. 1, 2020, which claims benefit of priority from Japanese Patent Application JP2019-234715, filed Dec. 25, 2019, the contents of both of which are incorporated herein by reference.

TECHNICAL FIELD

The present disclosure relates to a fuel piping, a fuel piping connecting structure, and a method for manufacturing a fuel piping.

BACKGROUND ART

A fuel piping for a direct injection internal combustion engine (see Patent Literature 1) is known. At the end portion of this type of fuel piping, a connecting head that is connected to a mating component is provided. The connecting head is a portion that bulges in a radial direction, comes into contact with the mating component, is further fastened to the mating component with a cap nut or the like such that the connecting head is interposed therebetween, and is connected to the mating component.

CITATION LIST

Patent Literature

[Patent Literature 1] Japanese Unexamined Patent Publication No. 2007-77807

SUMMARY OF INVENTION

Technical Problem

In the fuel piping of the related art, if a certain tightening torque is exceeded in tightening the cap nut or the like, the generated axial force may cause the connecting head to be deformed, and a predetermined axial force for sealing an internal pressure is less likely to be obtained. Particularly, in a case where the fuel piping is used as a high pressure fuel piping, a problem may occur.

An object of the present disclosure is to solve the above problem, and an object of the present disclosure is to provide a fuel piping, a fuel piping connecting structure, and a method for manufacturing a fuel piping in which a predetermined axial force for sealing an internal pressure can be easily obtained.

Solution to Problem

The present disclosure is a fuel piping including: an outer pipe that has a connecting head extending outward in a radial direction in at least one end portion thereof, and an inner pipe that is built in (is fitted inside) a part of the outer pipe and is connected to both end portions of the connecting head in an axial direction.

According to this fuel piping, the inner pipe is built in a part of the outer pipe, and the inner pipe is connected to both of the end portions of the connecting head in the axial direction. As a result, even if a tightening torque due to the fastening portion is increased, the connecting head is less likely to be deformed, and it is easy to obtain a predetermined axial force for sealing the internal pressure.

The present disclosure is a fuel piping connecting structure including: the above fuel piping; a connecting portion having an internal flow path configured to receive the connecting head of the fuel piping and to communicate with the fuel piping; and a fastening portion configured to fix the connecting head to the connecting portion. In this connecting structure, even if a tightening torque due to the fastening portion is increased, the connecting head is less likely to be crushed, and it is easy to obtain a predetermined axial force for sealing the internal pressure.

The present disclosure is a method for manufacturing a fuel piping, wherein a connecting head is formed by pressing one end portion of an outer pipe with an inner pipe built in at least the one end portion in an axial direction and causing the outer pipe to extend outward in a radial direction, and both end portions of the connecting head in the axial direction are connected to the inner pipe. It is possible to easily manufacture the fuel piping provided with the outer pipe in which the inner pipe connected to both of the end portions of the connecting head is built.

Advantageous Effects of Invention

According to the present disclosure, it is easy to obtain a predetermined axial force for sealing the internal pressure.

BRIEF DESCRIPTION OF DRAWINGS

FIG. 4 relates to a first manufacturing method of a fuel piping, and each of FIG. 4(*a*), FIG. 4(*b*), and FIG. 4(*c*) is an explanatory view showing one step.

FIG. 5 relates to the first manufacturing method of a fuel piping, and each of FIG. 5(*a*), FIG. 5(*b*), and FIG. 5(*c*) is an explanatory views showing one step.

FIG. 6 relates to a second manufacturing method of a fuel piping, and each of FIG. 6(*a*), FIG. 6(*b*), and FIG. 6(*c*) is an explanatory view showing one step.

FIG. 7 relates to the second manufacturing method of a fuel piping, and each of FIG. 7(*a*), FIG. 7(*b*), and FIG. 7(*c*) is an explanatory view showing one step.

FIG. 8 relates to the second manufacturing method of a fuel piping, and each of FIG. 8(*a*), FIG. 8(*b*), and FIG. 8(*c*) is an explanatory view showing one step.

DESCRIPTION OF EMBODIMENTS

A fuel piping according to an aspect of the present disclosure includes an outer pipe and an inner pipe built in (fitted inside) a part of the outer pipe. At least one end portion of the outer pipe is provided with a connecting head extending outward in a radial direction. The inner pipe is connected to both end portions of the connecting head in an axial direction.

In the fuel piping, the inner pipe is built in a part of the outer pipe, and the inner pipe is connected to both of the end portions of the connecting head in the axial direction. As a result, even if a tightening torque due to the fastening portion is increased, the connecting head is less likely to be deformed, and it is easy to obtain a predetermined axial force for sealing the internal pressure.

In the aspect, the inner pipe may be crimped to both of the end portions of the connecting head in the axial direction. Due to the crimping, the inner pipe and both of the end portions of the connecting head can be easily connected to each other.

In the aspect, the inner pipe may be brazed to both of the end portions of the connecting head in the axial direction. Due to the brazing, the inner pipe and both of the end portions of the connecting head can be firmly connected to each other.

In the aspect, the outer pipe includes a main body portion having a constant outer diameter in the axial direction and the connecting head extending outward in the radial direction with respect to the main body portion. One end portion of both of the end portions of the connecting head may be an open tip end, and the other end portion may be a portion on a side opposite to the tip end in the axial direction where the outer diameter changes with respect to the main body portion. When the fastening of the connecting head is performed with the fastening portion, stress concentration is likely to occur in a portion where the outer diameter changes with respect to the main body portion. In the above configuration, this portion is the other end portion of the connecting head. Since the inner pipe is connected to one end portion and the other end portion of the connecting head, the connecting head is less likely to be crushed, and it is easy to obtain a predetermined axial force for sealing the internal pressure.

A fuel piping connecting structure according to an aspect of the present disclosure includes: the above fuel piping; a connecting portion having an internal flow path configured to receive the connecting head of the fuel piping and to communicate with the fuel piping; and a fastening portion configured to fix the connecting head to the connecting portion. In this connecting structure, even if a tightening torque due to the fastening portion is increased, the connecting head is less likely to be crushed, and it is easy to obtain a predetermined axial force for sealing the internal pressure.

In a method for manufacturing a fuel piping according to an aspect of the present disclosure, a connecting head is formed by pressing one end portion of an outer pipe with an inner pipe built in at least the one end portion in an axial direction and causing the outer pipe to extend outward in a radial direction, and both end portions of the connecting head in the axial direction are connected to the inner pipe. It is possible to easily manufacture the fuel piping provided with the outer pipe in which the inner pipe connected to both of the end portions of the connecting head is built.

In the aspect, a brazing material may be disposed on an outer circumference of the inner pipe, and after the connecting head is formed, a heat treatment for removing residual stress may be performed to braze the inner pipe and the connecting head of the outer pipe to each other. It is possible to reliably connect the inner pipe and the connecting head of the outer pipe through the brazing while the heat treatment for removing residual stress is performed.

Hereinafter, a fuel piping according to an embodiment will be described. The fuel piping is, for example, a piping that connects a high pressure pump of a gasoline direct injection engine and a delivery pipe to each other. In recent years, it has become necessary to increase the pressure of the gasoline direct injection engine from the viewpoint of legal regulations and the like. The fuel piping according to the embodiment is particularly advantageous for use at high pressure. The fuel piping 1 is used, for example, with one end portion connected to the delivery pipe 2 (see FIG. 2) and the other end portion connected to the high pressure pump (not shown).

Figure 1:
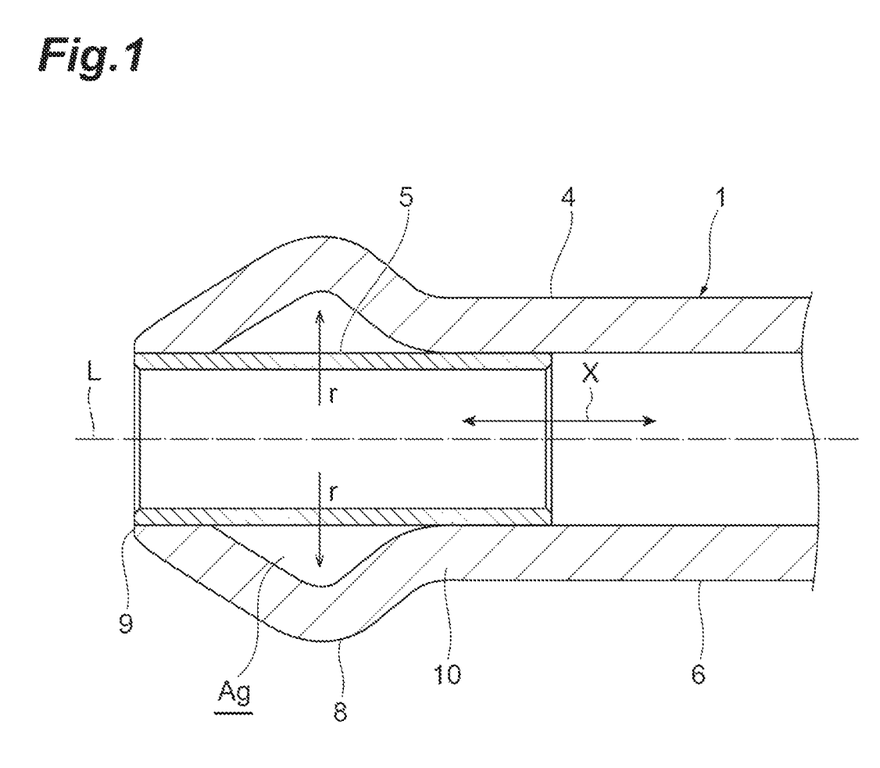
FIG. 1 is an enlarged cross-sectional view showing a part of a fuel piping according to an embodiment.

As shown in FIG. 1, the fuel piping 1 according to the embodiment includes an outer pipe 4 and a cylindrical component 5 (an inner pipe) built in the outer pipe 4. As the outer pipe 4 and the cylindrical component 5, for example, a pipe made of SUS can be used, and copper plating is further applied to the cylindrical component 5. The cylindrical component 5 is disposed not in the entire region of the outer pipe 4 in an axial direction X, but in a part close to one end (hereinafter referred to as "tip end"). The axial direction X of the outer pipe 4 means a direction along an axis L of the outer pipe 4. The outer pipe 4 includes a main body portion 6 having a constant outer diameter and a connecting head 8 extending outward in a radial direction r with respect to the main body portion 6. Here, the fact that the outer diameter of the main body portion 6 is constant means that the change in the outer diameter is within the range of error and the outer diameter is substantially constant. The range of this error means that it is in the range of ±1 mm. Further, the inner diameter of the cylindrical component 5 is, for example, 80% or less, preferably 70% or less, and more preferably 60% or less with respect to the inner diameter of the main body portion 6 of the outer pipe 4.

The connecting head 8 is provided as a portion including the tip end of the outer pipe 4. Specifically, the connecting head 8 is provided to extend outward in the radial direction r in the outer diameter and the inner diameter, has both end portions of the outer pipe 4 in the axial direction X, and both of the end portions are the starting points of the extending outward. One end portion is a released tip end of the outer pipe 4. The other end portion is a portion on a side opposite to the tip end in the axial direction X which is connected to the main body portion 6 and is a portion where the outer diameter changes with respect to the main body portion 6. In the following description, one end portion of the connecting head 8 is referred to as a tip end portion 9, and the other end thereof is referred to as a neck portion 10.

Regarding the neck portion 10, the portion where the outer diameter changes with respect to the main body portion 6 includes both the case where the outer diameter becomes larger and the case where the outer diameter becomes smaller. Further, the portion where the outer diameter changes with respect to the main body portion 6 does not mean only a location where the outer diameter starts to change with respect to the main body portion 6 (a change start location), but means a portion including a predetermined dimensional region in the axial direction X with the change start location as a reference. Specifically, the portion where the outer diameter changes with respect to the main body portion 6 means a portion including a predetermined dimensional region on a side of the main body portion 6 and a side of the tip end portion 9 with the change start location as a reference, and it is possible to find the predetermined dimensional region as, for example, a dimensional region in the axial direction X corresponding to 20% of the outer diameter of the main body portion 6.

The cylindrical component 5 is disposed inside the connecting head 8. The length of the cylindrical component 5 in the axial direction X is equal to or longer than the length of the connecting head 8 in the axial direction X. The cylindrical component 5 according to the present embodiment extends in the axial direction X from the tip end portion 9 of the connecting head 8 beyond a boundary between the connecting head 8 and the main body portion 6. Further, the cylindrical component 5 is connected to the tip end portion 9 and the neck portion 10 of the connecting head 8 to overlap them. For example, the cylindrical component 5 is crimped to the tip end portion 9 and the neck portion 10 of the connecting head 8. Further, the copper plating is applied on the outer periphery of the cylindrical component 5, and thus the outer periphery of the cylindrical component 5 is brazed to the tip end portion 9 and the neck portion 10 of the connecting head 8 through the welding of the copper plating. A brazing material such as a brazing sheet may be disposed on the outer periphery of the cylindrical component 5, and the cylindrical component 5 and the connecting head 8 may be brazed to each other with the brazing material.

Here, the connection between the neck portion 10 of the connecting head 8 and the cylindrical component 5 will be supplemented. As described above, since the neck portion 10 includes a predetermined dimensional region with the change start location as a reference, the connection between the neck portion 10 and the cylindrical component 5 means that the cylindrical component 5 is connected to at least a part of a region in the axial direction X where the neck portion 10 is formed. Further, the same applies to crimping the cylindrical component 5 to the neck portion 10 or brazing the cylindrical component 5 to the neck portion 10, and it means that the cylindrical component 5 is crimped or brazed to at least a part of the region in the axial direction X where the neck portion 10 is formed.

The connecting head 8 extends outward such that not only the outer diameter but also the inner diameter expands in the radial direction r, and there is a space Ag as a gap between the connecting head 8 and the cylindrical component 5. However, a form without the space Ag is also possible. In this case, the cylindrical component 5 is connected to the connecting head 8 over the entire region of the connecting head 8 in the axial direction X in addition to the tip end portion 9 and the neck portion 10 (both end portions) of the connecting head 8. The technical significance of the cylindrical component 5 being connected to the connecting head 8 relates to an aspect in which the cylindrical component 5 is fixed to the connecting head 8 to such an extent that the movement of the cylindrical component 5 in the axial direction X is restricted. In the present embodiment, the space Ag is between the connecting head 8 and the cylindrical component 5, and the cylindrical component 5 extends beyond the space Ag and is connected to the connecting head 8. That is, when the space Ag is taken into consideration as a reference, it is also possible to find a portion where the connecting head 8 comes into contact with the cylindrical component 5 and closes the space Ag on a tip end side of the space Ag as the tip end portion 9 of the connecting head 8, and it is also possible to find a portion where the connecting head 8 comes into contact with the cylindrical component 5 and closes the space Ag on a side opposite to the tip end side in the axial direction as the neck portion 10 of the connecting head 8.

Figure 2:
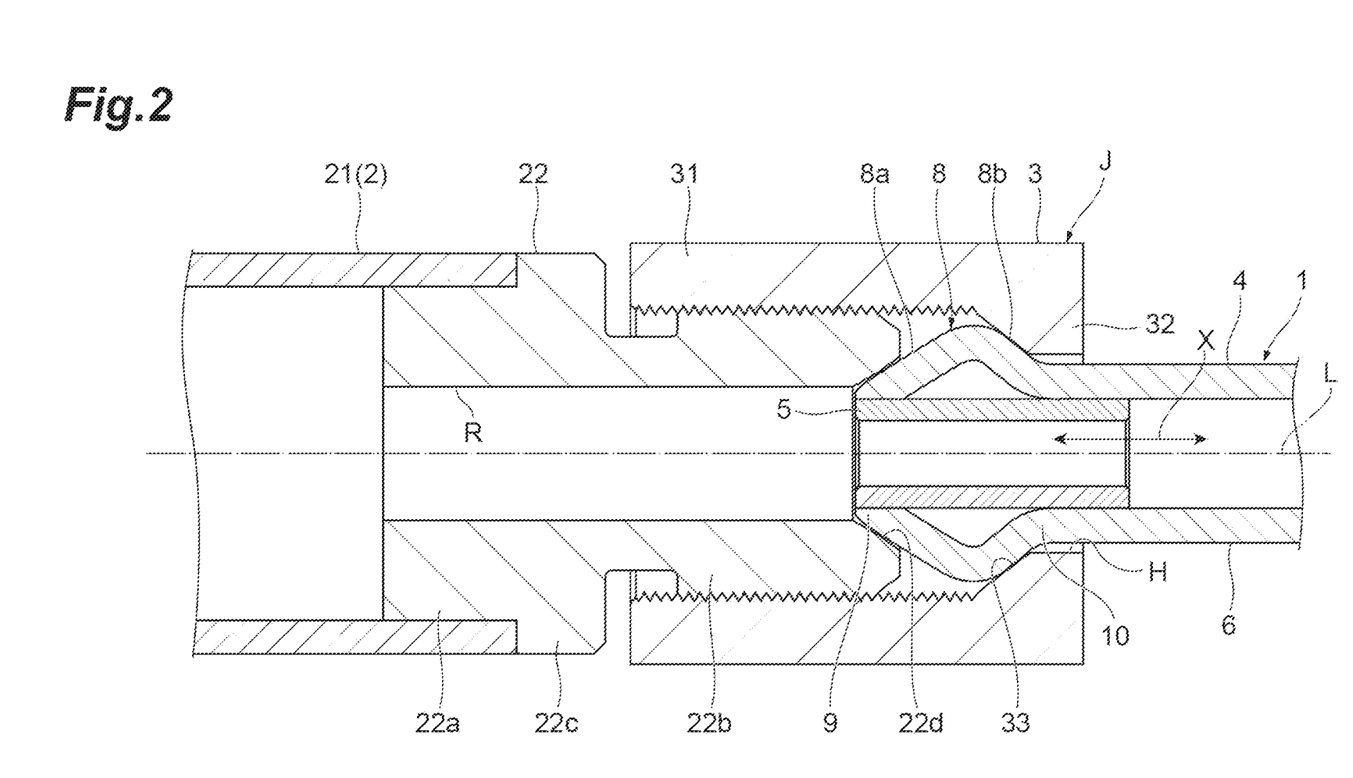
FIG. 2 is a cross-sectional view showing a fuel piping connecting structure according to an embodiment.

Next, a connecting structure J of the fuel piping 1 will be described. As shown in FIG. 2, the connecting structure J includes the fuel piping 1, a pipe joint 22, and a fastening portion 3 for fixing the connecting head 8 to the pipe joint 22. An internal flow path R that receives the connecting head 8 of the fuel piping 1 and communicates with the fuel piping 1 is formed in the pipe joint 22. In the present embodiment, the pipe joint 22 is fixed to a receiving port 21 of the delivery pipe 2 and is an example of a connecting portion. In a case where the fuel piping 1 is directly attached to the receiving port 21 or the like of the delivery pipe 2, the receiving port 21 is an example of the connecting portion.

A fixed pipe portion 22a that is fitted into and joined to the receiving port 21 is provided on a side of one end portion of the pipe joint 22 with the internal flow path R as a reference. A screwed pipe portion 22b screwed into the fastening portion 3 is provided on a side of the other end portion of the pipe joint 22. A flange portion 22c that comes into contact with the receiving port 21 is provided between the fixed pipe portion 22a and the screwed pipe portion 22b.

A receiving surface 22d that comes into contact with the connecting head 8 of the fuel piping 1 is formed at the end portion (the tip end) of the screwed pipe portion 22b. On the receiving surface 22d, the internal flow path R expands in a tapered shape. An inclination surface 8a of the connecting head 8 on a side of the tip end portion 9 comes into contact with the receiving surface 22d, and an inclination surface 8b of the connecting head 8 on a side of the neck portion 10 comes into contact with the fastening portion 3.

The fastening portion 3 includes a tubular body portion 31 in which a female screw to be screwed to the screwed pipe portion 22b is formed, and a pressing portion 32 that comes into contact with and presses against the connecting head 8. One end portion of the body portion 31 is open, and the pressing portion 32 is provided at an end portion of the body portion 31 on a side opposite to the one end portion. The pressing portion 32 is provided in an annular shape (a doughnut shape) to reduce the diameter from the body portion 31, and a central hole H through which the main body portion 6 of the fuel piping 1 is inserted is formed in the center of the pressing portion 32. A tapered pressing surface 33 that comes into contact with the inclination surface of the connecting head 8 on a side of the neck portion 10 is formed inside the pressing portion 32.

Next, a method for forming the connecting structure J of the fuel piping 1 will be described. The pipe joint 22 is fixed to the receiving port 21 of the delivery pipe 2. The main body portion 6 of the fuel piping 1 passes through the central hole H of the fastening portion 3, and in this state, the connecting head 8 of the fuel piping 1 comes into contact with the receiving surface 22d of the pipe joint 22. The body portion 31 of the fastening portion 3 is screwed into the screwed pipe portion 22b of the pipe joint 22. Then, the connecting head 8 is interposed between the receiving surface 22d of the pipe joint 22 and the pressing surface 33 of the fastening portion 3. In order to ensure sufficient sealing performance for withstanding the internal pressure generated inside the fuel piping 1, it is necessary to apply further torque to the fastening portion 3 for screwing. If the connecting head 8 is deformed with the axial force generated by this screwing, it becomes difficult to ensure sufficient sealing performance. However, in the fuel piping 1 according to the present embodiment, the cylindrical component 5 is built in the connecting head 8, and the cylindrical component 5 is connected to both of the end portions of the connecting head 8 in the axial direction X, that is, the tip end portion 9 and the neck portion 10, and thus the fuel piping 1 has a structure for withstanding the deformation of the connecting head 8.

Figure 3:
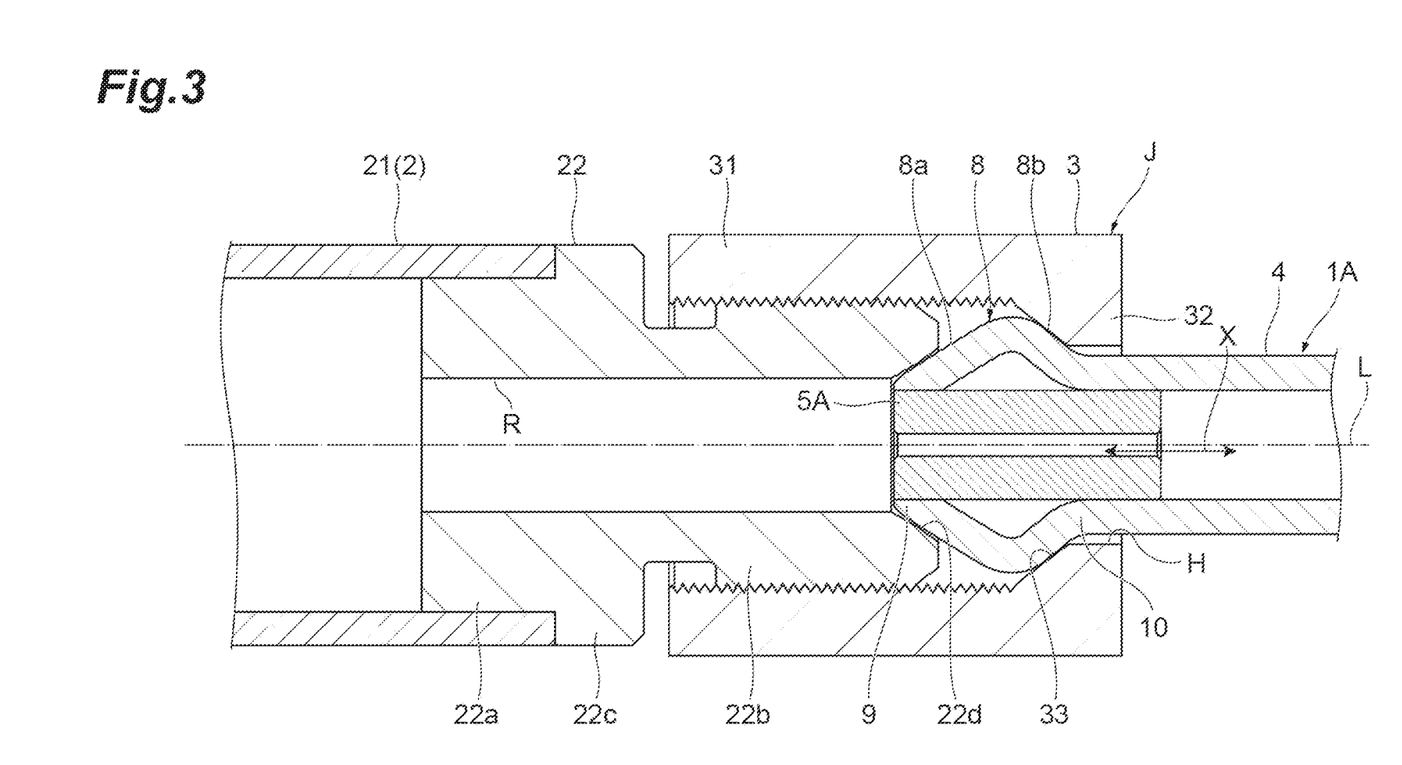
FIG. 3 is a cross-sectional view showing a fuel piping connecting structure according to another embodiment.

Next, a fuel piping 1A according to another embodiment will be described with reference to FIG. 3. The fuel piping 1A according to another embodiment includes the same members and elements as the fuel piping 1 and the connecting structure J of the fuel piping 1 according to the above embodiment. Therefore, similar members and elements are designated by the same reference signs and detailed description thereof will be omitted.

In the fuel piping 1A, an orifice pipe 5A is used instead of the above-mentioned cylindrical component 5. The orifice pipe 5A is, for example, a pipe made of SUS, and can be appropriately cut and manufactured. The length of the orifice pipe 5A in the axial direction X is equal to or longer than the length of the connecting head 8 in the axial direction X. The orifice pipe 5A is disposed to overlap the tip end portion 9 and the neck portion 10 of the connecting head 8. Further, the orifice pipe 5A is crimped to the tip end portion 9 and the neck portion 10 of the connecting head 8. Further, the copper plating is applied on the outer periphery of the orifice pipe 5A, and thus the outer periphery of the orifice pipe 5A is brazed to the tip end portion 9 and the neck portion 10 of the connecting head 8 through the welding of the copper plating. Also in the fuel piping 1A, the orifice pipe 5A and the connecting head 8 may be brazed to each other with the brazing material such as a brazing sheet.

The orifice pipe 5A has a smaller inner diameter than the cylindrical component 5. Specifically, the thickness of the above-mentioned cylindrical component 5 is smaller than the inner diameter of the cylindrical component 5, but the thickness of the orifice pipe 5A is larger than the inner diameter of the orifice pipe 5A. Further, the inner diameter of the orifice pipe 5A is, for example, 30% or less, preferably 22% or less, and more preferably 20% or less with respect to the outer diameter of the orifice pipe 5A. Further, the inner diameter of the orifice pipe 5A is, for example, 60% or less, preferably 40% or less, and more preferably 30% or less with respect to the inner diameter of the main body portion 6 of the outer pipe 4.

Next, the operation and effect of the fuel piping 1 or 1A and the connecting structure J of the fuel piping 1 or 1A according to the above embodiment will be described. As the pressure of the gasoline direct injection engine increases, the stress generated due to the internal pressure also increases, and thus it is necessary to ensure the sealing performance for withstanding this internal pressure. Therefore, it is necessary to increase the tightening torque at the fastening portion. However, in a fuel piping that does not have the inner pipe such as the cylindrical component (a comparative form), the axial force generated due to the addition of the tightening torque at the fastening portion may cause the connecting head to be deformed, and it is difficult to ensure a predetermined axial force for sealing the internal pressure.

On the other hand, in the fuel piping 1 or 1A and the connecting structure J of the fuel piping 1 or 1A according to each embodiment, the cylindrical component 5 or the orifice pipe 5A is built in the connecting head 8, and the cylindrical component 5 or the orifice pipe 5A is connected to the tip end portion 9 and the neck portion 10 of the connecting head 8. That is, in the fuel piping 1 or 1A and the connecting structure J of the fuel piping 1 or 1A, the cylindrical component 5 or the orifice pipe 5A has a structure for withstanding the deformation of the connecting head 8. As a result, even if the tightening torque at the fastening portion 3 is increased in order to ensure the sealing performance, the connecting head 8 withstands the axial force generated by the addition of the tightening torque, and thus it is easy to obtain a predetermined axial force for sealing the internal pressure.

Further, the cylindrical component 5 or the orifice pipe 5A according to each embodiment is connected to at least the tip end portion 9 and the neck portion 10. As a result, even if a force for deforming the connecting head 8 is applied due to the addition of the tightening torque, this force acts as a force that causes the tip end portion 9 or the neck portion 10 to be reduced in diameter. Therefore, the adhesion of the connecting head 8 with respect to the cylindrical component 5 or the orifice pipe 5A is increased, which is advantageous in terms of improving the sealing performance.

Further, in a case where the fuel piping 1 or 1A according to each embodiment is manufactured, even if a terminal processing method such as a manufacturing method which will be described later, for example, a method for forming the connecting head 8 by pressing the tip end portion 9 of the outer pipe 4 is employed, it is possible to prevent a depression from being generated in the neck portion 10 of the connecting head 8. Specifically, it is possible to prevent the pipe wall of the outer pipe 4 from retreating toward the center of the pipe and a depression circling in a circumferential direction from being generated. That is, in each embodiment, the cylindrical component 5 or the orifice pipe 5A is built in the outer pipe 4, and the cylindrical component 5 or the orifice pipe 5A extends from the tip end portion 9 of the connecting head 8 to the neck portion 10 of the connecting head 8. As a result, the cylindrical component 5 or the orifice pipe 5A withstands the force for reducing the diameter of the neck portion 10 of the connecting head 8 during the terminal processing, and it is possible to prevent a depression from being generated in the neck portion 10.

Further, in the case of the fuel piping 1A in which the orifice pipe 5A is built, the orifice pipe 5A can be manufactured by cutting or the like, and the inner diameter dimension of the orifice pipe 5A can be appropriately designed (adjusted). Here, for example, in a fuel piping that does not have the orifice pipe 5A or the like (a comparative form), it is difficult to set an orifice that locally narrows the flow path when it is tried to form the connecting head by the terminal processing. On the other hand, in the fuel piping 1A described above, the orifice can be easily set by building the orifice pipe 5A in the outer pipe 4. Further, by removing the orifice pipe 5A from the outer pipe 4 as needed, it is possible to improve the liquid leakage at the time of cleaning the inside of the outer pipe 4, it becomes easier to meet the requirement of the internal foreign matter, and the defect due to the residual contamination can be also reduced.

Further, the cylindrical component 5 or the orifice pipe 5A according to each embodiment is crimped to the tip end portion 9 and the neck portion 10 of the connecting head 8. Due to this crimping, in the present embodiment, the cylindrical component 5 and the tip end portion 9 and the neck portion 10 of the connecting head 8 can be easily connected to each other.

Further, the cylindrical component 5 or the orifice pipe 5A according to each embodiment is brazed to the tip end portion 9 and the neck portion 10 of the connecting head 8. Due to this brazing, in the present embodiment, the cylindrical component 5 and the tip end portion 9 and the neck portion 10 of the connecting head 8 can be firmly connected to each other.

Further, in the fuel piping 1 or 1A according to each embodiment, the neck portion 10 of the connecting head 8 is a portion whose outer diameter changes with respect to the main body portion 6. When the fastening of the connecting head 8 is performed with the fastening portion 3, stress concentration is likely to occur in a portion where the outer diameter changes with respect to the main body portion 6, and this portion is the neck portion 10 of the connecting head 8. Since the cylindrical component 5 or the orifice pipe 5A is connected to the tip end portion 9 and the neck portion 10 of the connecting head 8, the connecting head 8 is less likely to be crushed, and it is easy to obtain a predetermined axial force for sealing the internal pressure.

Next, a method for manufacturing the fuel piping 1 will be described. Hereinafter, the fuel piping 1 according to an embodiment will be described as an example, but the fuel piping 1A according to another embodiment is substantially the same. The method for manufacturing the fuel piping 1 includes a step of building the cylindrical component 5 (the inner pipe) in the tip end portion 9 of the outer pipe 4 (a building-in step), a step of forming the connecting head 8 by pressing the tip end portion 9 of the outer pipe 4 with the cylindrical component 5 built in the tip end portion 9 in the axial direction X and causing the outer pipe 4 to extend outward in the radial direction r (a terminal processing step), and a step of connecting the tip end portion 9 and the neck portion 10 of the connecting head 8 to the cylindrical component 5 (a connecting step). Further, the connecting step according to the present embodiment includes a crimping step and a brazing step. The crimping step is performed at the same time as the terminal processing step, and the brazing step is performed after the crimping step. Hereinafter, a first manufacturing method and a second manufacturing method will be described.

Figure 4:
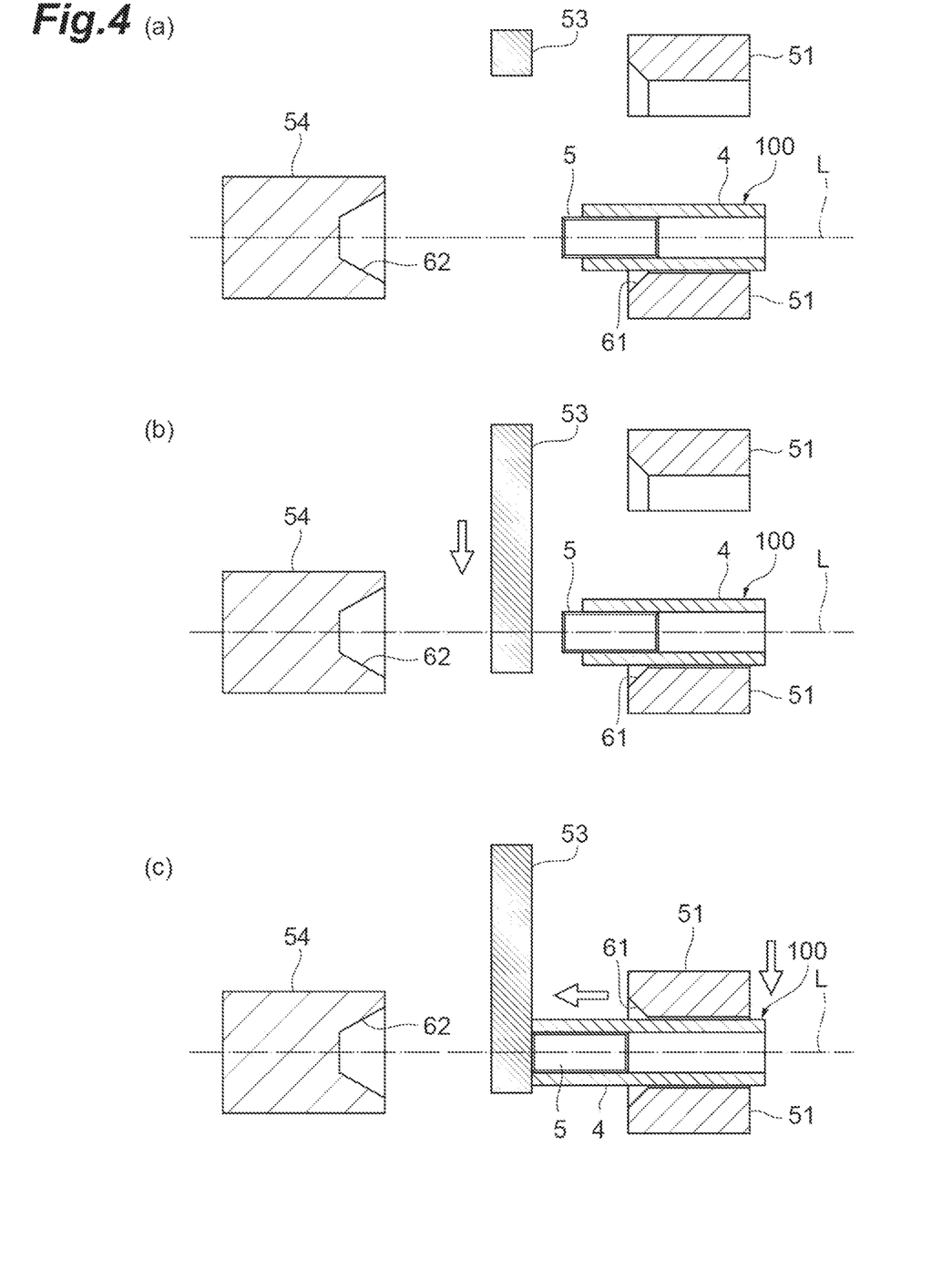
Figure 5:
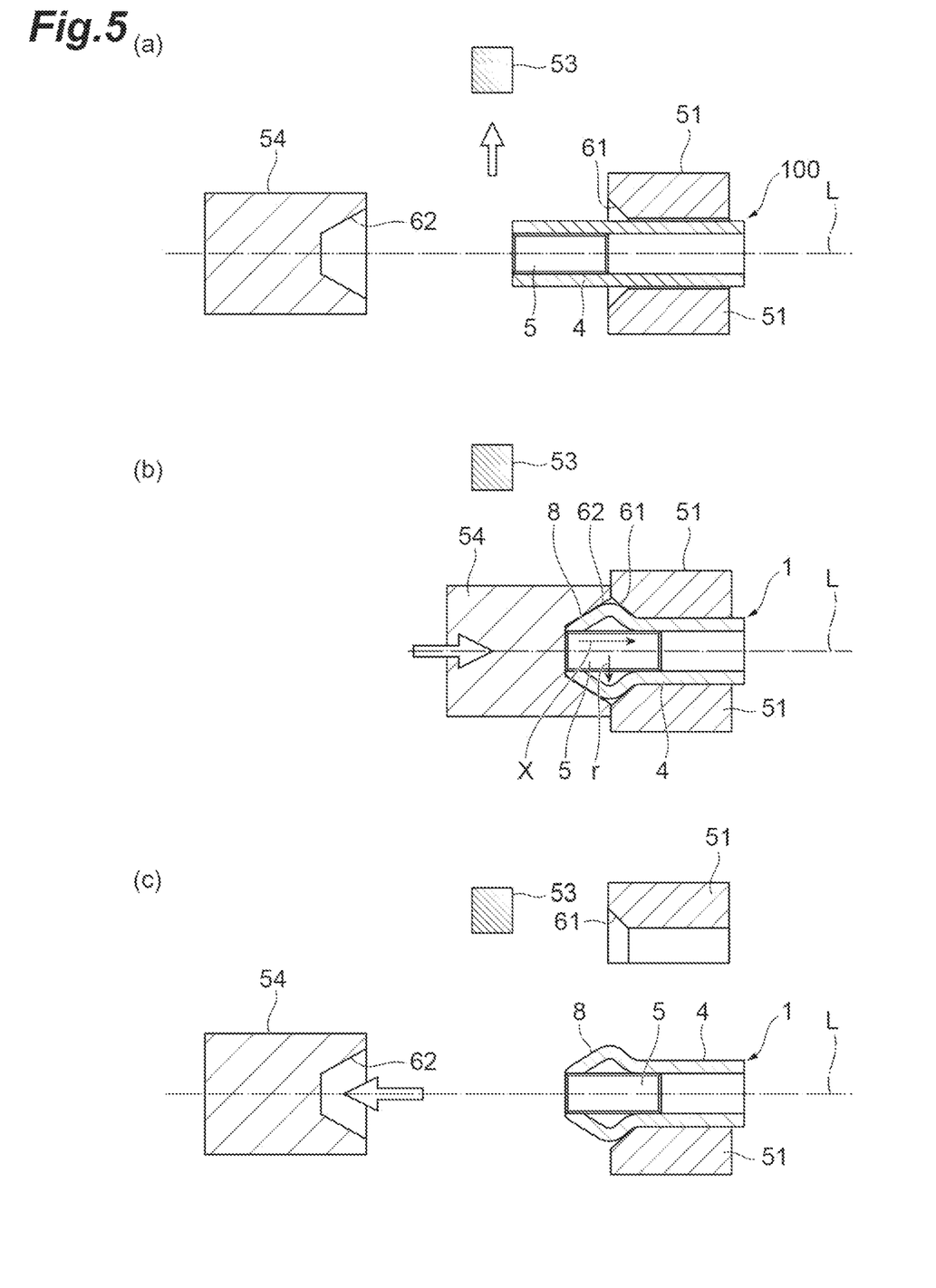

First, the first manufacturing method will be described with reference to FIGS. 4 and 5. In the building-in step of the first manufacturing method, the cylindrical component 5 is inserted in advance into the outer pipe 4 before the formation of the connecting head 8 to form a precursor pipe 100. For example, a manufacturing apparatus of the fuel piping 1 includes a chuck 51. The chuck 51 has a groove 61 that follows the shape of the inclination surface of the connecting head 8 on a side of the neck portion 10 and the shape of the main body portion 6. The precursor pipe 100 is placed in the groove 61 of the chuck 51 in an opened state (see FIG. 4(*a*)).

The manufacturing apparatus includes a stopper 53 that pushes the cylindrical component 5 to a predetermined position in the outer pipe 4. The stopper 53 moves to a predetermined position intersecting the axis L of the outer pipe 4 (see FIG. 4(*b*)). Next, the precursor pipe 100 is pressed against the stopper 53 for positioning, and the chuck 51 is closed (see FIG. 4(*c*)). Next, the stopper 53 is separated from the precursor pipe 100 and is returned to the original position (see FIG. 5(*a*)).

Next, the terminal processing step is carried out. In the terminal processing step, a punch 54 disposed on the axis L of the outer pipe 4 is brought close to the precursor pipe 100 (see FIG. 5(*b*)). In this state, the precursor pipe 100 is restricted from moving in the axial direction X. The punch 54 has a groove 62 that follows the shape of the inclination surface of the connecting head 8 on a side of the tip end portion 9. When the punch 54 presses the tip end portion 9 of the precursor pipe 100, the outer pipe 4 of the precursor pipe 100 bulges to extend outward in the radial direction r while being crushed in the axial direction X. A bulging portion of the outer pipe 4 is formed to follow the shapes of the grooves 61 and 62 of the chuck 51 and the punch 54 and becomes the connecting head 8. When the cylindrical component 5 built in the outer pipe 4 is pressed by the punch 54, the cylindrical component 5 slides in the axial direction X instead of being crushed. The tip end portion 9 and the neck portion 10 of the connecting head 8 formed by the bulging of the outer pipe 4 are slightly reduced in diameter and are crimped substantially to the cylindrical component 5 to be connected to the cylindrical component 5 (the crimping step in the connecting step). When the connecting head 8 is formed, the precursor pipe 100 becomes the fuel piping 1, the punch 54 is retracted away from the connecting head 8, and the chuck 51 is opened.

Next, the fuel piping 1 removed from the chuck 51 is introduced into a heating furnace and is subjected to heat treatment for removing the residual stress. In the fuel piping 1 according to the present embodiment, the copper plating is applied on the outer periphery of the cylindrical component 5 as a brazing material, and the copper plating is melted through the above heat treatment, and as a result, brazing is performed between the cylindrical component 5 and the outer pipe 4 (the brazing step).

Figure 7:
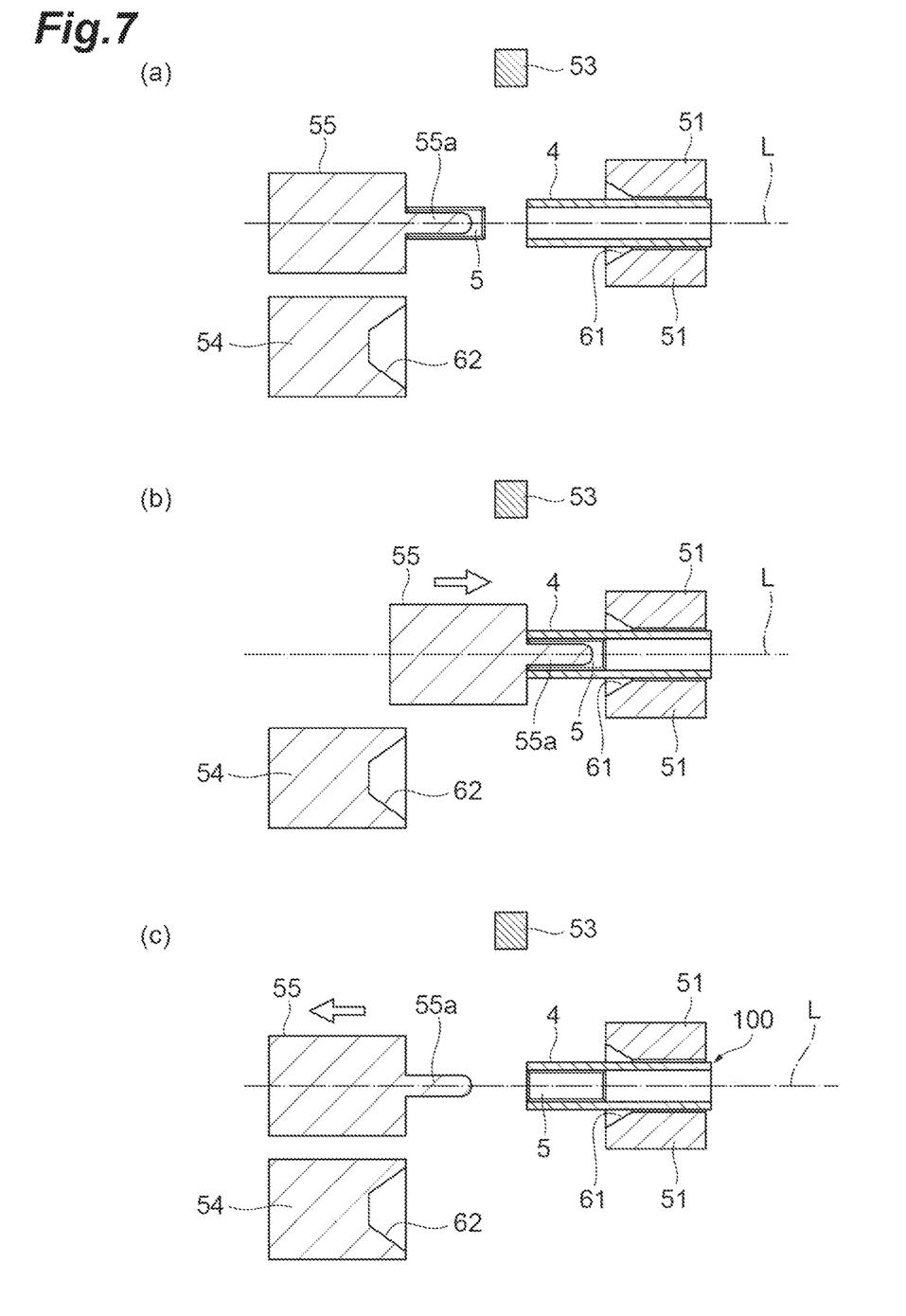
Figure 8:
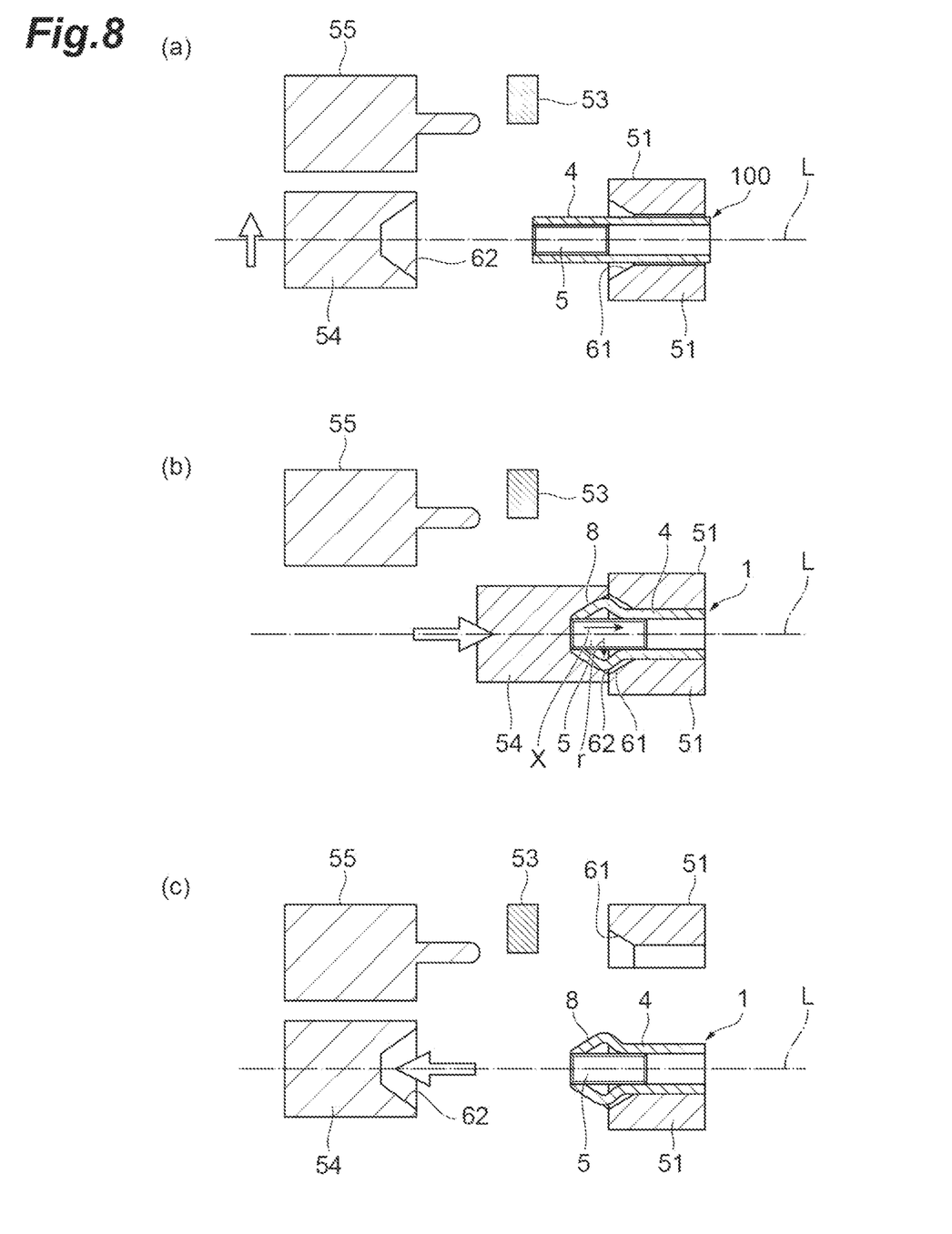

Next, the second manufacturing method will be described with reference to FIGS. 6, 7, and 8. In the building-in step of the second manufacturing method, the cylindrical component 5 is built in the tip end portion 9 of the outer pipe 4. For example, the manufacturing apparatus of the fuel piping 1 includes a mounting portion 55 for building the cylindrical component 5 in the outer pipe 4. The mounting portion 55 includes a fitting portion 55*a* for holding the cylindrical component 5, and the cylindrical component 5 is mounted on the fitting portion 55*a* (see FIG. 6(*a*)).

Figure 6:
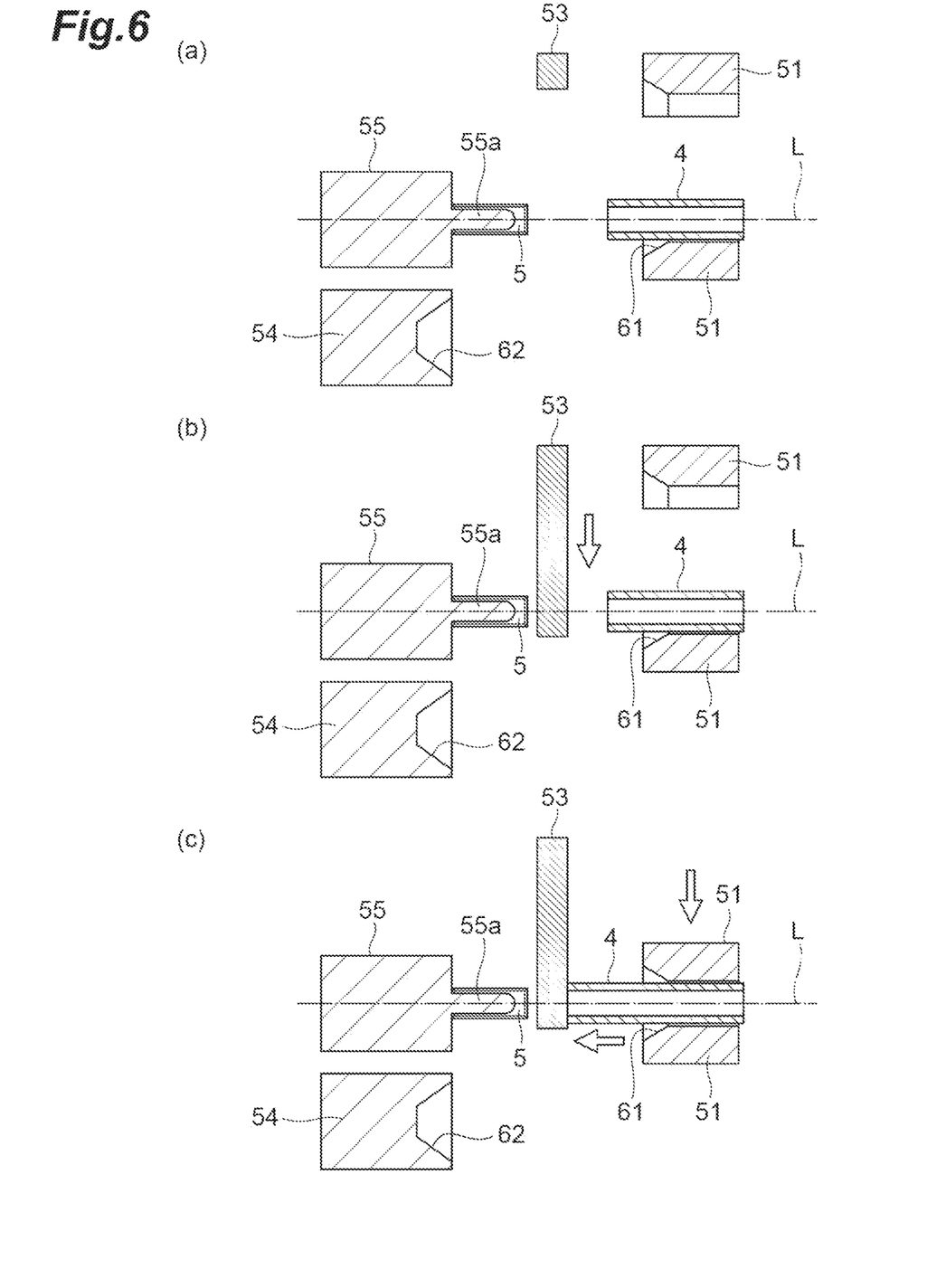

First, the stopper 53 moves to a predetermined position intersecting the axis L of the outer pipe 4 (see FIG. 6(*b*)). Next, the outer pipe 4 is pressed against the stopper 53 for positioning, and the chuck 51 is closed (see FIG. 6(*c*)). Next, the stopper 53 is separated from the outer pipe 4 and is returned to the original position (see FIG. 7(*a*)). Next, the mounting portion 55 is moved toward the outer pipe 4, and the fitting portion 55*a* is press-fitted into the outer pipe 4 together with the cylindrical component 5 (see FIG. 7(*b*)). The fitting portion 55*a* is separated from the outer pipe 4 while leaving the cylindrical component 5 in the outer pipe 4, and the precursor pipe 100 is formed (see FIG. 7(*c*)).

Next, the terminal processing step is carried out. In the terminal processing step, the punch 54 moves to a position on the axis L of the outer pipe 4 instead of the mounting portion 55 (see FIG. 8(*a*)). Next, the punch 54 is brought close to the precursor pipe 100 (see FIG. 8(*b*)). In this state, the precursor pipe 100 is restricted from moving in the axial direction X. The punch 54 has a groove 62 that follows the shape of the inclination surface of the connecting head 8 on a side of the tip end portion 9. When the punch 54 presses the tip end portion 9 of the precursor pipe 100, the outer pipe 4 of the precursor pipe 100 bulges to extend outward in the radial direction r while being crushed in the axial direction X. A bulging portion of the outer pipe 4 is formed to follow the shapes of the grooves 61 and 62 of the chuck 51 and the punch 54 and becomes the connecting head 8. When the cylindrical component 5 built in the outer pipe 4 is pressed by the punch 54, the cylindrical component 5 slides in the axial direction X instead of being crushed. The tip end portion 9 and the neck portion 10 of the connecting head 8 formed by the bulging of the outer pipe 4 are slightly reduced in diameter and are crimped substantially to the cylindrical component 5 to be connected to the cylindrical component 5 (the crimping step in the connecting step). When the connecting head 8 is formed, the precursor pipe 100 becomes the fuel piping 1, the punch 54 is retracted away from the connecting head 8, and the chuck 51 is opened (see FIG. 8(*c*).

Next, the fuel piping 1 removed from the chuck 51 is introduced into a heating furnace and is subjected to heat treatment for removing the residual stress. In the fuel piping 1 according to the present embodiment, the copper plating is applied on the outer periphery of the cylindrical component 5 as a brazing material, and the copper plating is melted through the above heat treatment, and as a result, brazing is performed between the cylindrical component 5 and the outer pipe 4 (the brazing step).

According to the above method for manufacturing the fuel piping 1, it is possible to easily manufacture the fuel piping 1 provided with the outer pipe 4 in which the cylindrical component 5 connected to the tip end portion 9 and the neck portion 10 of the connecting head 8 is built.

Although the present disclosure has been described by taking each embodiment as an example, the present disclosure is not limited to the above embodiment, and for example, the connection between the connecting head and the inner pipe may be only the crimping without the brazing or may be only the brazing without the crimping. The crimping is intended to include a concept of the fitting, and the connection between the connecting head and the inner pipe includes screwing and other coupling aspects.

Further, the outer pipe is not limited to a form having two ends of one end and the other end and may be, for example, a form that branches in the middle and has three or more ends. The outer pipe includes an aspect in which the connecting head is formed in at least one end of a plurality of ends.

REFERENCE SIGNS LIST 1, 1A Fuel piping
4 Outer pipe
3 Fastening portion
5 Cylindrical component (inner pipe)
5A Orifice pipe (inner pipe)
6 Main body portion
8 Connecting head
9 Tip end portion (one end portion of connecting head)
10 Neck portion (the other end portion of connecting head)
22 Pipe joint (connecting portion)
J Connecting structure
R Internal flow path
r Radial direction
X Axial direction

The invention claimed is:

1. A fuel piping comprising:
an outer pipe having a connecting head extending outward in a radial direction in at least one end portion thereof; and
an inner pipe built in a part of the outer pipe and connected to both end portions of the connecting head in an axial direction,
wherein the inner pipe is crimped to both of the end portions of the connecting head in the axial direction.

2. The fuel piping according to claim 1, wherein the inner pipe is brazed to both of the end portions of the connecting head in the axial direction.

3. The fuel piping according to claim 1,
wherein the outer pipe includes a main body portion having a constant outer diameter in the axial direction and the connecting head extending outward in the radial direction with respect to the main body portion, and
wherein one end portion of both of the end portions of the connecting head is an open tip end, and an other end portion of both of the end portions of the connecting head is a portion on a side opposite to the tip end in the axial direction where the outer diameter changes with respect to the main body portion.

4. A fuel piping connecting structure comprising:
the fuel piping according to claim 1;
a connecting portion having an internal flow path configured to receive the connecting head of the fuel piping and to communicate with the fuel piping; and
a fastening portion configured to fix the connecting head to the connecting portion.

5. A method for manufacturing a fuel piping,
wherein a connecting head is formed by pressing one end portion of an outer pipe with an inner pipe built in at least the one end portion in an axial direction and causing the outer pipe to extend outward in a radial direction, and both of the end portions of the connecting head in the axial direction are connected to the inner pipe
wherein a brazing material is disposed on an outer circumference of the inner pipe, and
wherein, after the connecting head is formed, a heat treatment for removing residual stress is performed to braze the inner pipe and the connecting head of the outer pipe to each other.

* * * * *